(12) United States Patent
Flueter (10) Patent No.: US 7,289,512 B2
(45) Date of Patent: Oct. 30, 2007

(54) ATM TRANSMISSION SYSTEM

(75) Inventor: Heribert Flueter, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 861 days.

(21) Appl. No.: 10/027,126

(22) Filed: Dec. 20, 2001

(65) Prior Publication Data

US 2002/0118681 A1   Aug. 29, 2002

(30) Foreign Application Priority Data

Dec. 22, 2000  (EP) .................................. 00128352

(51) Int. Cl.
H04L 5/14 (2006.01)
H04L 5/16 (2006.01)

(52) U.S. Cl. ................................. 370/395.21

(58) Field of Classification Search ........ 370/395–396, 370/229, 256, 230, 412, 399, 235, 232, 468, 370/329, 437, 338, 337, 389, 249–253, 351, 370/360, 377, 471; 379/112.1; 709/213, 709/232, 235; 375/130; 398/25; 455/410, 455/450, 552.1
See application file for complete search history.

(56) References Cited

U.S. PATENT DOCUMENTS

| 5,231,631 | A | * | 7/1993 | Buhrke et al. | ............... | 370/230 |
| 5,309,501 | A | * | 5/1994 | Kozik et al. | ................ | 455/410 |
| 5,872,773 | A | * | 2/1999 | Katzela et al. | ............... | 370/256 |
| 6,356,629 | B1 | * | 3/2002 | Fourie et al. | ............ | 379/112.1 |
| 6,529,958 | B1 | * | 3/2003 | Oba et al. | .................... | 709/237 |
| 6,538,777 | B1 | * | 3/2003 | Barry et al. | .................. | 398/25 |
| 6,782,035 | B1 | * | 8/2004 | Nakamura et al. | .......... | 375/130 |
| 2002/0094818 | A1 | * | 7/2002 | Itagaki | ........................ | 455/450 |
| 2004/0047288 | A1 | * | 3/2004 | Basso et al. | ................ | 370/229 |
| 2005/0083853 | A1 | * | 4/2005 | Rooney et al. | ............. | 370/252 |

FOREIGN PATENT DOCUMENTS

EP    0557902 A    9/1993

OTHER PUBLICATIONS

Jian Xu, Kai Hwang; Heuristic methods for dynamic load balancing in a message-passing supercomputer, Nov. 1990; Proceedings of the 1990 ACM/IEEE conference on Supercomputing; Publisher: IEEE Computer Society; pp. 888-897.*
International Search Report for Application No. PCT/EP01/15131.
Effectiveness of UBR VC Approach in AAL2 Networks and Its Application to IMT-2000, Hiroshi Saito, vol. E83-B, No. 11, Nov. 2000, pp. 2486-2493.

* cited by examiner

*Primary Examiner*—Chi Pham
*Assistant Examiner*—Prenell Jones
(74) *Attorney, Agent, or Firm*—Fish & Richardson P.C.

(57) ABSTRACT

A method for transmitting information in paths of an asynchronous transfer mode (ATM) network includes initiating setup of at least one new path in the ATM network if a capacity of a path currently used for transmission of information exceeds a setup threshold, assigning ATM channels to the at least one new path after setting-up the at least one new path, and initiating release of at least one path in the ATM network if a capacity of a path currently used for transmission of information is below a release threshold.

27 Claims, 10 Drawing Sheets

| Parameters | Meaning |
|---|---|
| S, S0, S1, S2 | Source of the setup request (e.g. AESA address identifying a network element) |
| T | Target of the setup request (format as above) |
| CC | Connection characteristics: A set of parameters describing SVC connection characteristics (cell rates, traffic type, path type, AAL2 parameters, QoS parameters, etc ...) |
| P, P0, P1, P2 | AAL type 2 paths |
| A, A0, A1, A2 | Accesses |
| VP | Virtual path, virtual path connection |
| VC | Virtual channel |

ATM TRANSMISSION SYSTEM

This application claims priority to European Patent Application No. EP00128352.2, filed Dec. 22, 2000, the contents of which are hereby incorporated by reference into this application as if set forth herein in full.

BACKGROUND

AAL type 2 switching as a resource saving variant of ATM based switching methods requires virtual channel connections (VCC, in the following called 'AAL type 2 path' or simply 'path'.) as bearers of AAL type 2 connections. The AAL type 2 paths may be provided as permanent paths (PVC VCC), or as switched paths (SVC VCC), or as soft PVC VCC. It is an object of the invention to enable network elements to set up SVC paths in a flexible, dynamical and anticipatory way according to the traffic volume carried by the network, and to release SVC paths when the traffic volume is decreasing.

Known solutions exclusively use PVCs as paths. There are no solution providers or publications known which are using, or do intend to use SVCs as paths.

SUMMARY

Processes are described herein to enable network elements to set up SVC-paths in a flexible, dynamic and anticipatory way in a network according to the traffic volume, and to release SVC-paths again when traffic volume is decreasing.

The setup and release of paths is controlled by access resource management. An important element of resource management is a mechanism, which uses (administrable or preset) threshold values to recognize, whether the currently available path capacity is sufficient, or whether the path capacity is too high. The verification of the path capacity is performed each time when resources (bandwidth, AAL type 2 channels) are requested for the setup of an AAL type 2 connection ('call by call'), or when AAL type 2 connection resources are to be released. Depending on the result of the verification, resource management initiates the setup of a new path, releases an unused path, or decides to leave the path configuration as it is. The functions necessary to setup and release a path are performed by switching components, especially provided for this task, and using a suitable signalling. Those switching components, and also other intermediate switching components involved in the setup of calls, may use network-learned routing information (that is exchanged by a suitable protocol) or administered routing information for the setup of new paths. Moreover, such routing information may also be used by those switching components when choosing a path to be released.

One advantage of such a solution is the reduction of administrative efforts to be provided by a network operator. Another advantage is the adaption of ATM based virtual transmission paths to the current traffic volume, automatically controlled by the network element. The invention allows to just in time provide those AAL type 2 transmission paths, which are currently needed to process the AAL type 2 traffic without interfering with that traffic.

The following description of embodiments of the invention and the enclosed figures disclose further possible features and advantages of the invention.

Dynamical AAL Type 2 Path Switching

DESCRIPTION OF THE DRAWINGS 0.1 List of figure and tables

DETAILED DESCRIPTION 0.2 Abbreviations

| | | |
|---|---|---|
| A | AAL | ATM Adaption Layer |
| | AESA | ATM End System Address |
| | AINI | ATM Internetwork Interface |
| | AM | Access Manager |
| | ATM | Asynchronous Transfer Mode |
| | ATMF | ATM Forum |
| | A2C | AAL type 2 Channel |
| | A2SC | AAL type 2 Server Card |
| B | BCF | Bearer Control Function |
| C | CAM | Call Maintenance |
| | CIH | Connection Identifier Handler |
| | CRA | Connection Resource Agent |
| | CRH | Connection Resource Handler |
| D | DBMS | Data Base Management System |
| | DSS2 | Digital Subscriber Signalling #2 |
| E | EP | Endpoint |
| | ESIS | Enhanced Signalling Interworking Subsystem |
| F | FIFO | First in first out |
| I | IE | Information Element |
| | ISDN | Integrated Services Digital network |
| | ISUP | ISDN User Part |
| | ITU | International Telecommunications Union |
| L | LC | Leg Controller |
| | LH | Leg Handler |
| | LIC | Line Interface Card |
| N | NNI | Network to Network Interface |
| | NRM | Network Routing Manager |
| P | PNNI | Private Network Node Interface |
| | PRH | Protocol Handler |
| | PVC | Permanent Virtual Channel |
| R | RHS | Resource Handler Subsystem |
| | RNC | Radio Network Controller |
| S | SAG | Signalling Agent |
| | SLT | Signalling Link Termination |
| | SVC | Switched Virtual Connection |
| | SVP | Switched Virtual Path |
| T | TRAU | Transcoding and Rate Adaption Unit |
| | TSC | TRAU Server Card |
| U | UNI | User to Network Interface |
| V | VC | Virtual Channel |
| | VCC | Virtual Channel Connection |
| | VCI | Virtual Channel identifier |
| | VP | Virtual Path |
| | VPC | Virtual Path Connection |
| | VPCI | Virtual Path Connection Identifier |
| | VPI | Virtual path identifier |

0.3 Overview

AAL type 2 switching depends on virtual channel connections (VCC) as bearers of AAL type 2 connections. The VCCs may be represented by permanent VCCs (PVC), by switched VCCs (SVC), or by switched PVCs (also called soft PVCs). The description puts its focus on SVCs. If soft PVC implementation is desired, the ability to switch virtual channels is a prerequisite.

The advantage of using switched virtual channels rather than PVCs obviously is a reduction of administrative efforts. An operator is not forced to initially build up PVCs within the network, and to continously measure the traffic for the purpose of keeping PVC path resources up to date. The network dynamically and automatically establishes the AAL type 2 paths as required by the traffic flows through it.

Mixed operation shall however be supported. Operators of small networks may prefer the PVC solution. Others may decide to use PVCs towards the access side (connecting RNCs), but are favouring SVCs meshing the network.

0.4 Signalling

Consulting the standards, ITU-T amendments to Q.2931 define additional information elements or extensions to existing ones such as the AAL parameters IE or the generic transport identifier IE to support AAL type 2 switching using SVCs.

ATMF papers clearly suggest DSS2 signalling protocols, such as UNI signalling 4.0 (which may be considered identical to Q.2931), or AINI and PNNI.

AINI signalling has been developed by the standardization bodies for inter-network communication, especially between PNNI and non-PNNI networks. Since nobody talks about ISUP in the context of SVC pathes for AAL type 2 switching, the recommendation (and furthermore more the working assumption) is to implement UNI and AINI signalling.

So far there are no standards existing which specify the procedures to be used when setting up or releasing AAL type 2 paths based on SVCs.

0.5 Connection Control Architecture

Figure 1:
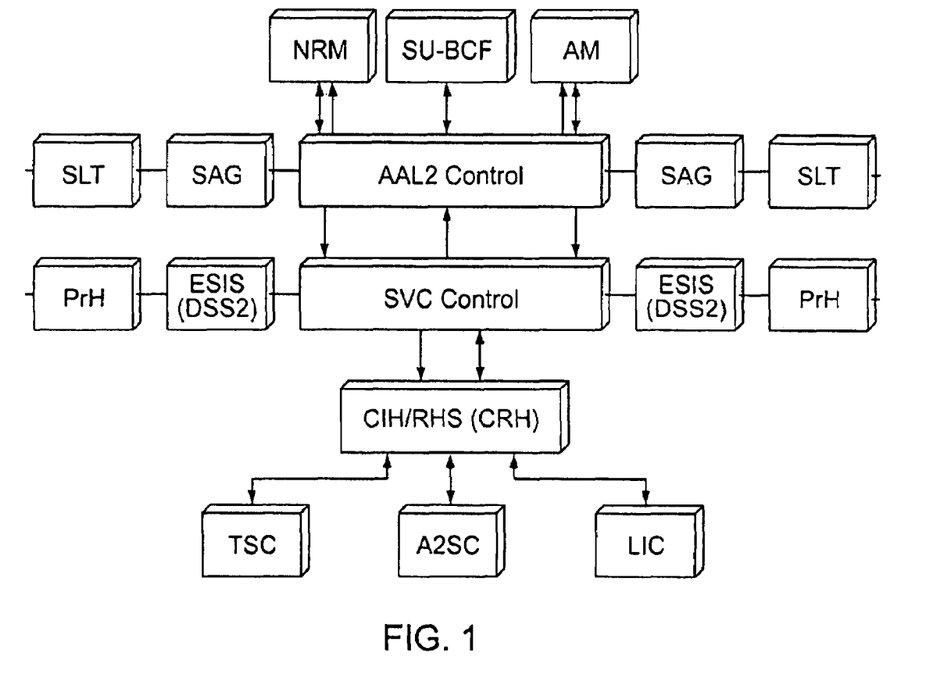
FIG. 1: Connection control elements

Referring to FIG. 1, the centrally located connection control functions comprise the AAL type 2 connection processing (AAL2 control) and the SVC connection processing (SVC control). The SVC connections represent the paths of AAL type 2 connections.

The signalling agent (SAG) and the related signalling link terminations (SLT) interface to AAL2 control, whereas ESIS and its protocol handler (PrH) will serve SVC control.

The interfaces to the access manager (AM) and network routing manager (NRM) are common to both AAL2 and SVC control.

Towards the periphery, AAL2 control interfaces with the connection identifier handler (CIH), which in turn handles the switching requests to the server cards TSC and A2SC, whereas switching requests from SVC control take the path via the resource handler (RHS) towards A2SC and LIC. Alternatively CIH and RHS may be merged to a connection resource handler (CRH), commonly holding the interface to connection control and to the peripheral units.

SVC control has no interface with call control. The bearer control function (BCF) of a served user communicates with AAL2 control only.

There will be no direct interface between SVC and AAL2 control, for example via a message interface. The coupling is indirect via AM, which indeed decides when to set up or release an AAL type 2 path.

0.6 The Access Manager 0.6.1 Access Data Structures

The access manager AM plays a central part in the AAL type 2 path switching mechanism. AM is dedicated to allocate and release resources for the setup and release of AAL type 2 connections carried by PVC and SVC paths, as well as to allocate and release resources for the setup and release of SVC connections as the the paths of AAL type 2 connections.

As a DBMS download unit, AM manages download data and transient data of accesses, virtual path connections (VPC, in the traditional ATM context), virtual channels (VC, switched or permanent), and AAL type 2 channels. This makes AM the overall access related resource holder, and puts it into a position to most efficiently decide, when AAL2 paths need to be setup or released.

Figure 2:
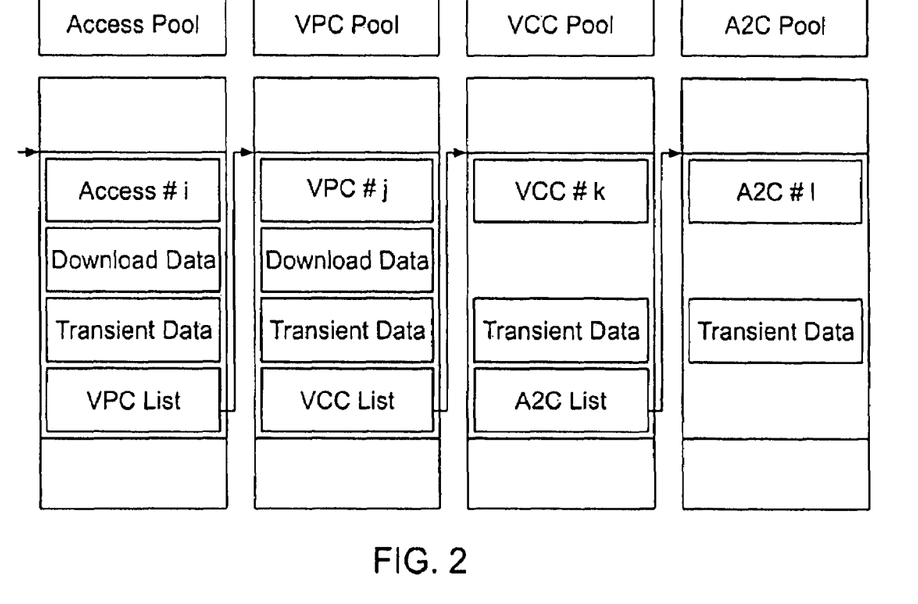
FIG. 2: AM data structures

Referring to FIG. 2, four hierarchical data object levels are shown, beginning with accesses via virtual path connections and virtual channel connections (the AAL type 2 paths), down to the AAL type 2 channels. It is not intended here to give a complete data model. A few characteristics, as far as AAL type 2 path switching is concerned, shall however be highlighted.

From the viewpoint of SVC control, an access can be a UNI or an NNI (AINI) access. Threshold values, as needed for opportune path setup or release, could be attached to accesses or, alternatively, to VPCs.

Due to AAL type 2 path switching, the data object level 'VPC' is introduced. VPCs, like in classical ATM switching, may carry attributes such as traffic type (e.g. constant bit rate), maximum of allowed peak cell rates, SVC selection methods, or AAL type 2 traffic type (voice, data). Accumulated cell rates of active virtual channels are at least required as part of the transient data.

Switched VCCs do not have download data. Accumulated traffic data such as currently used cell rates or the number of active AAL type 2 channels need to be kept as transient data.

The third data type (lists, as indicated in the figure) comprises members of a data object. The term 'list' is to be understood in a common sense. The implemented data structures shall ensure that members can be searched, added, and deleted by use of their identifiers within efficient time.

0.6.2 Path Selection

As a minimum requirement, the forward and backward sequential SVC assignment method shall be implemented. It is recommended, to implement a forward and backward circular assignment as well. Optionally, one may consider FIFO queuing mechanisms.

0.6.3 Path Monitoring

Figure 3:
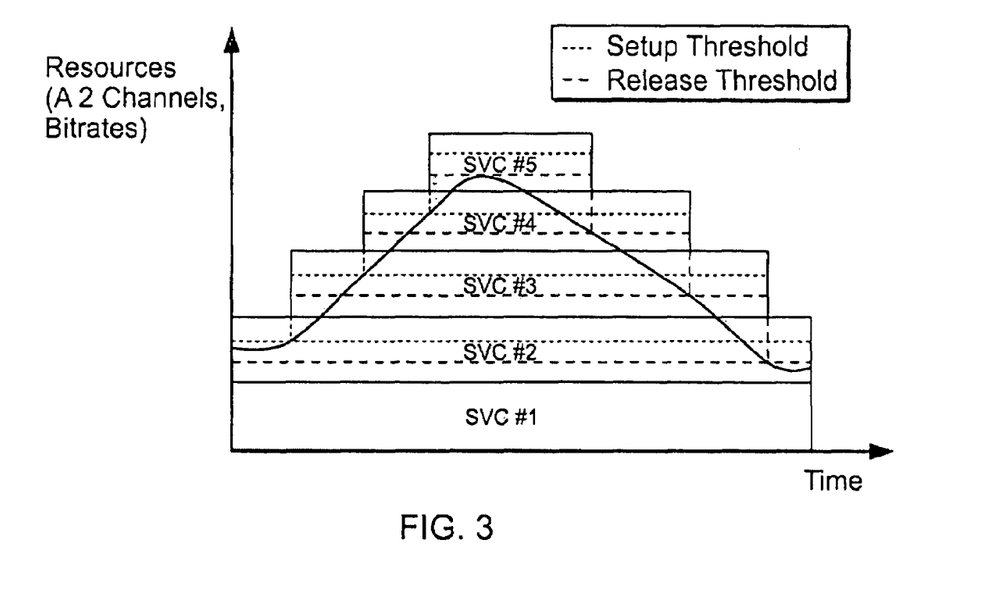
FIG. 3: Path reservation

Referring to FIG. 3, the decision when to initiate a new path setup or path release is made by AM on a per call basis, that is, whenever AM is called by AAL2 control to allocate or deallocate resources for an AAL type 2 connection setup or release. AM compares the currently consumed path capacity (accumulated cell rates, number of AAL type 2 channels) with given threshold values.

If on allocating resources the threshold value for setup is exceeded, AM selects a new path, and sends a message to SVC control, requesting the setup of the path. SVC control confirmes the completion of path setup. Now AM may assign AAL type 2 channels to the new path.

Simularly, if upon deallocating the resources of an AAL type 2 connection the currently consumed path resources fall below the threshold value for release, AM requests SVC control to release a previously reserved, inactive path.

In general, one may tailor a threshold mechanism for the SVC selection method. Referring to the example below, a forward sequential selection is assumed, and AAL type 2 connections are assigned to the lowest path possible. Hence AM fills up from bottom to top, which makes the path on top the next candidate for release.

A threshold mechanism independent of SVC selection methods may be achieved, if one considers the sum of all active path resources, and defines the threshold values as distances to the available resources of all active pathes.

0.6.4 Path Ownership

Path monitoring as described above is performed by an AM which is allocating resources for an originating AAL2 connection endpoint. In this way AM becomes the owner of a path, and indeed may be considered as a user requesting path setup. The path owner eclusively allocates a path identifier. An AM verifying the requested AAL type 2 connection resources at the destination endpoint of a path must assume that the path owner monitors the path resources. Consequently, only the path owner may release the path.

0.6.5 Exceptional Conditions

Within normal operation, the threshold mechanism shall ensure that path resources are provided in advance. There may occur situations however, where provision in advance cannot be guaranteed. Whenever a VPC is brought into service (again), triggered by administration or by call maintenance, there will be no path existing. With the mechanism above, this will be detected when AM needs to assign an AAL type 2 connection to a path. AM now requests path setup, but for the present must reject resource allocation to AAL2 control.

The problem can be overcome by automatically establishing a first path within a VPC as soon as AM receives the indication (from DBMS or possibly CAM) that a VPC is available for connection processing.

Another exceptional situation may occur, when extremely bulky traffic comes in within a short period of time.

As a general backup solution with a good chance not to loose the call, AAL2 control shall reattempt the connection setup after an appropriate delay, whenever it receives a rejection from AM indicating 'no path available, requesting setup'.

0.7 Routing

SVC and AAL2 control commonly use the same routing, ideally having the same routing interface.

The routing manager shall be able to deliver different routing result categories, such as 'local destination', if the path terminates in the own network element, or 'routing destination', if the path has to be routed further. The criteria to terminate the path may be based on translation of the called party number, or on comparison of the called party number with the own network element address.

0.8 Alternative Routing Capability Shall be Supported. Path Switching

Figure 4:
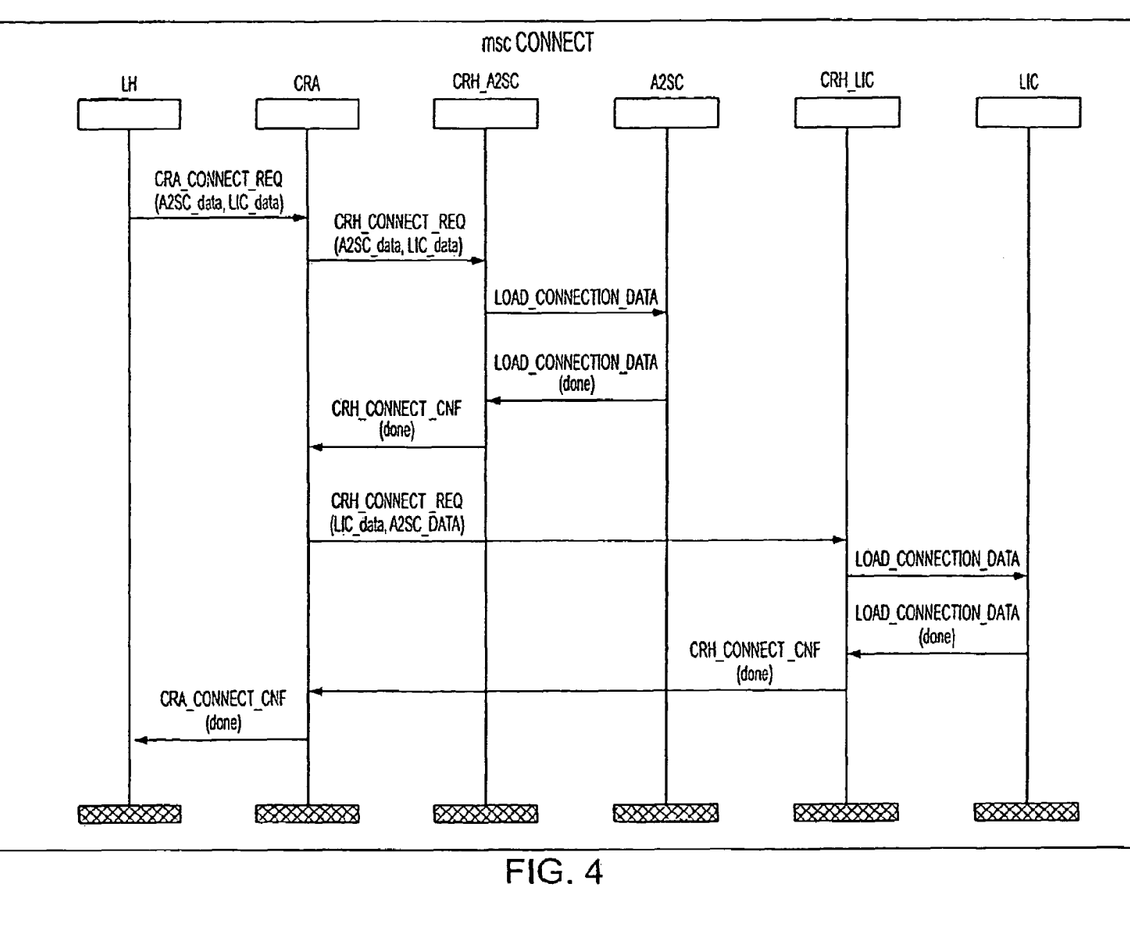
FIG. 4: Connecting A2SC and LIC

Referring to FIG. 4, the requests to connect or disconnect paths are initiated by the leg handlers, and addressed to a connection resource agent (CRA), residing within SVC control.

CRA maps the received information into messages towards the responsible resource handlers (we will call them CRH), sends the messages, receives the confirmations, and acknowledges to the leg handler (LH).

The sample figure does not intend to dictate the message flow towards the periphery. Whether or not a sequentialization is required (as shown in the figure), depends on further analysis studies. For performance reasons, parallel tasks should be preferred whenever possible. If any coordinative functions are required, they shall be in hands of CRA.

Coordination (sequentialization) by CRA may be also necessary in cases, when the connection setup is aborted due to failures, either encountered by SVC control, or signalled by a partner service (AM or ESIS). The release procedures of the leg handlers then may request a premature disconnection, although previously issued connect requests are not yet completed.

Figure 5:
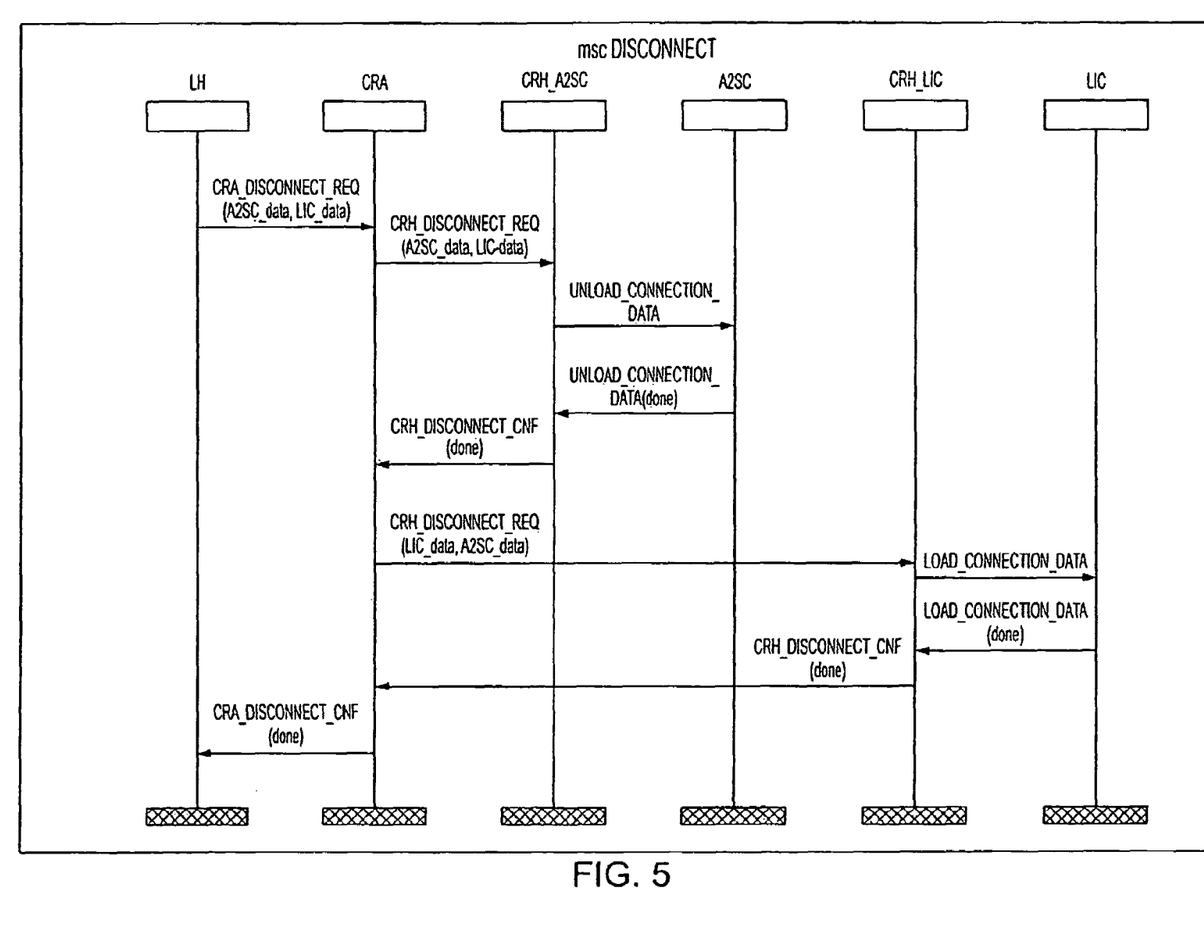
FIG. 5: Disconnecting A2SC and LIC

Similar aspects matter when disconnecting a path as shown in FIG. 5. Certain path setup scenarios may require and automatic setup repeat attempt, or an alternative routing attempt. Due to performance reasons, the outgoing leg (represented by LH and an ESIS instance) are released simultaneously to setting up a new leg (with new LH and ESIS instances). Considering the activities towards the periphery, this means that disconnect requests are likely to be still on the way, when another connect request arrives at CRA.

Figure 6:
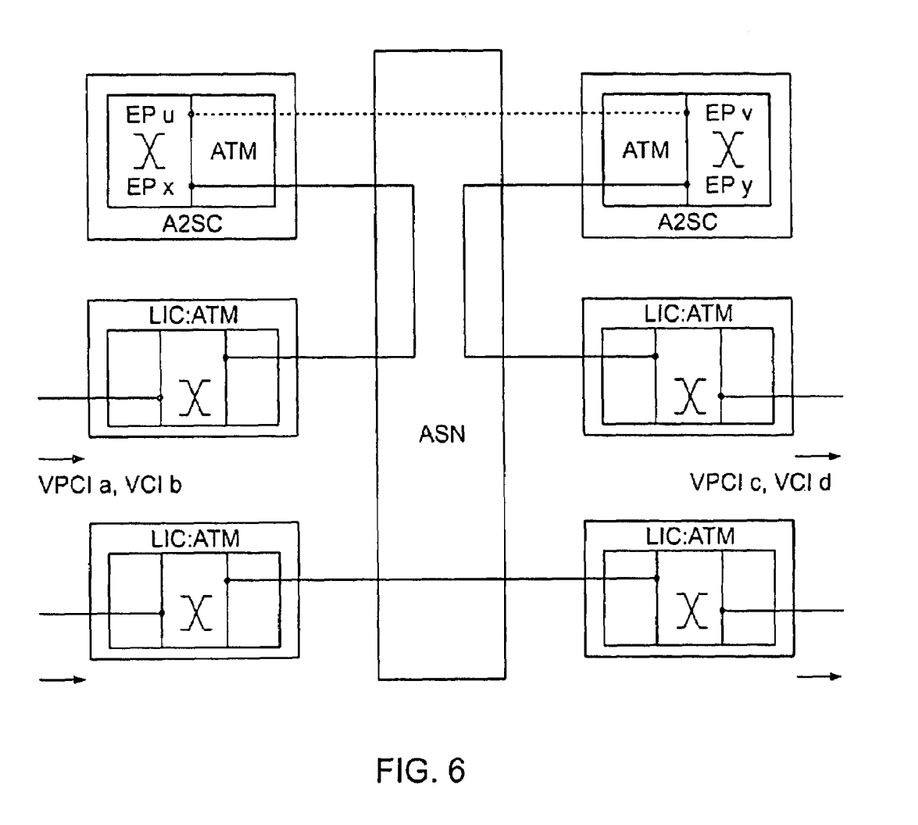
FIG. 6: Traffic flow

FIG. 6 shows a (simplified) traffic flow through the ATM switching fabrics after having connected LICs to AAL type 2 server cards.

In the upper left corner, a path, externally identified by VPCI=a and VCI=b, has been switched through the LIC, and terminated on A2SC at endpoint x. The same has been done for an endpoint y, VPCI=c and VCI=d. The arrows are denoting the direction of call setup from the calling party towards the called party, but not necessarily the direction of path setup. This depends on the interface (radio or network interface), and in case of a network interface on the chosen type of forward or backward bearer establishment.

The dotted line with the internal endpoints u and v represents the AAL type 2 sphere of influence, which is not shown in detail here.

0.9 Basic Path Setup and Release

Figure 7:
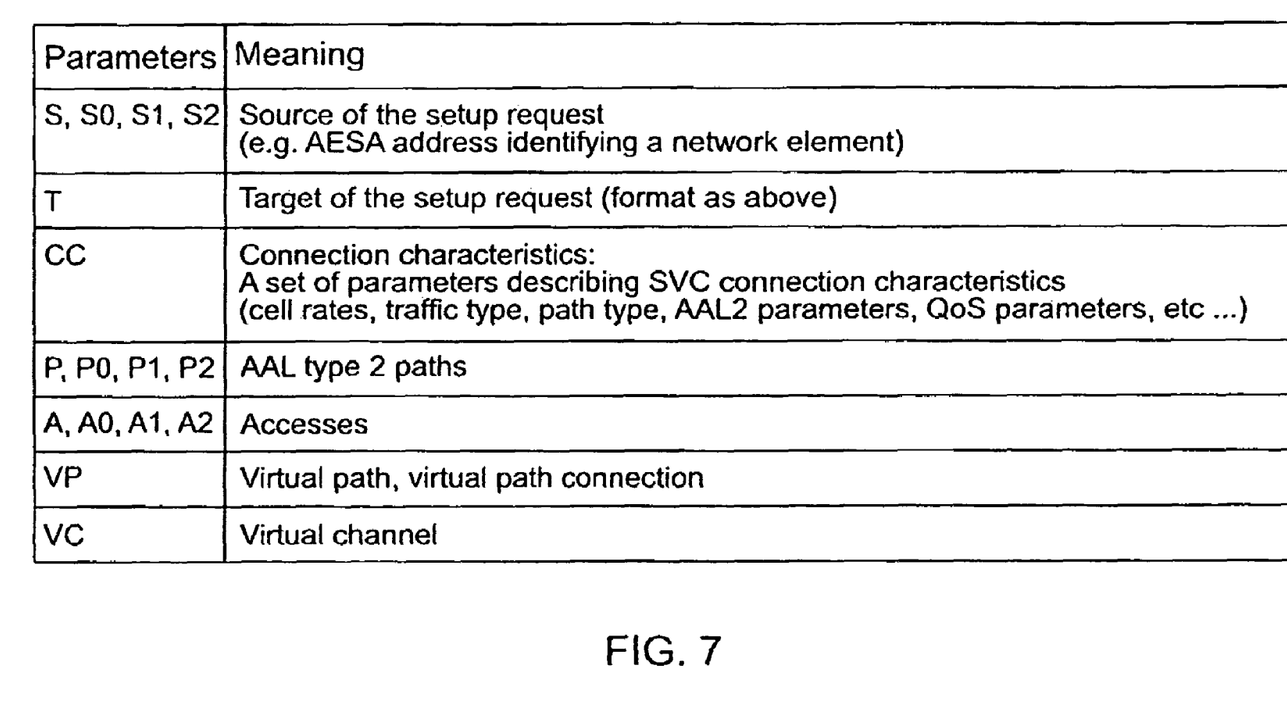
FIG. 7: Message parameters

We are now prepared to set up and release SVC paths. The table of FIG. 7 shows a list of parameters used in message flow charts.

0.9.1 Path Setup at the Originating Endpoint (1)

Figure 8:
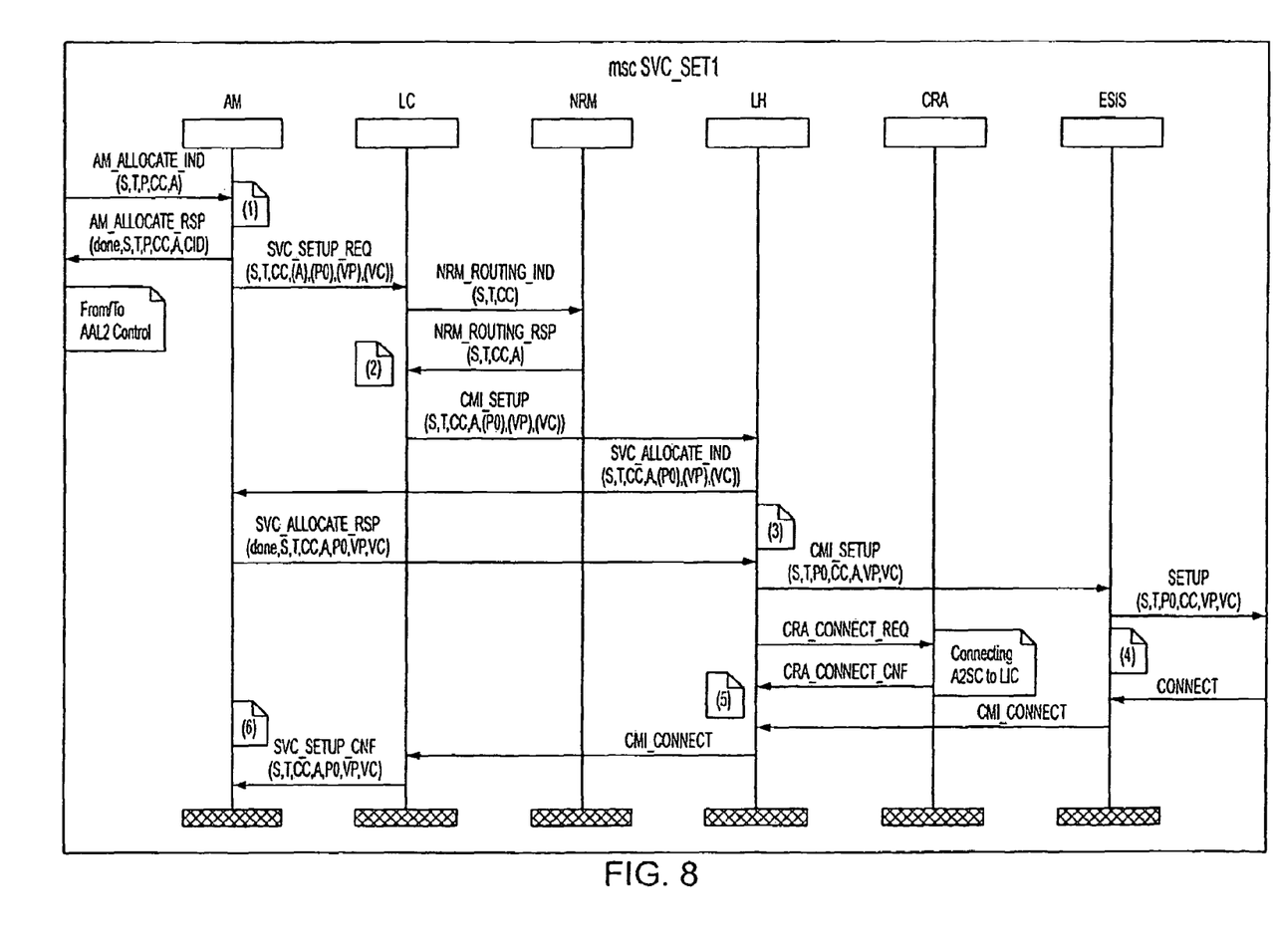
FIG. 8: Path setup at the originating endpoint

Referring to FIG. 8, the decision to set up a new path is made by AM, triggered by an AM_ALLOCATE_IND from AAL 2 control, and is based on the implemented threshold mechanism. AM allocates the resources requested by AAL2 control, and determines that the threshold value is exceeded. Hence, AM sends an SV_SETUP_REQ message to the leg controller (LC) of SVC control. The message contains the source and target network elements, represented by calling and called party numbers. This information is provided to AM by AAL2 control, and is passed on to SVC control to ensure that AAL type 2 connections and paths take the same route through the transport network. Furthermore, the message contains the connection characteristics, which are externally signaled, and which are needed to perform path switching towards the periphery.

(2)

The leg controller calls the network routing manager (NRM), providing it at least with the target network element. Certain connection characteristics, serving as additional route selection criteria, and the source network element may be provided as well. NRM returns a route (an access), which is included into the CMI_SETUP message sent to the leg handler.

(3)

The leg handler calls AM via SVC_ALLOCATE_IND, delivering the access and connection characteristics. AM assigns VPCI, VCI, and path identifier, and allocates the resources. LH inserts these data into the CMI_SETUP message to ESIS. Simultaneously, LH issues a connect request to CRA (see also chapter 'path switching').

(4)

ESIS encodes the CMI_SETUP into a SETUP message, and sends it via its protocol handler to the adjacent network element. The arrival of a first backward message is monitored by a timer (as required by Q.2931). The decoded CONNECT message is passed on to LH.

(5)

LH awaits both the confirmation from CRA and the CMI_CONNECT message from ESIS, before reporting back to LC.

(6)

LC confirms the setup to AM, which now activates the path for the transport of AAL type 2 connections.

0.9.2 Path Setup at the Destination Endpoint (1)

Figure 9:
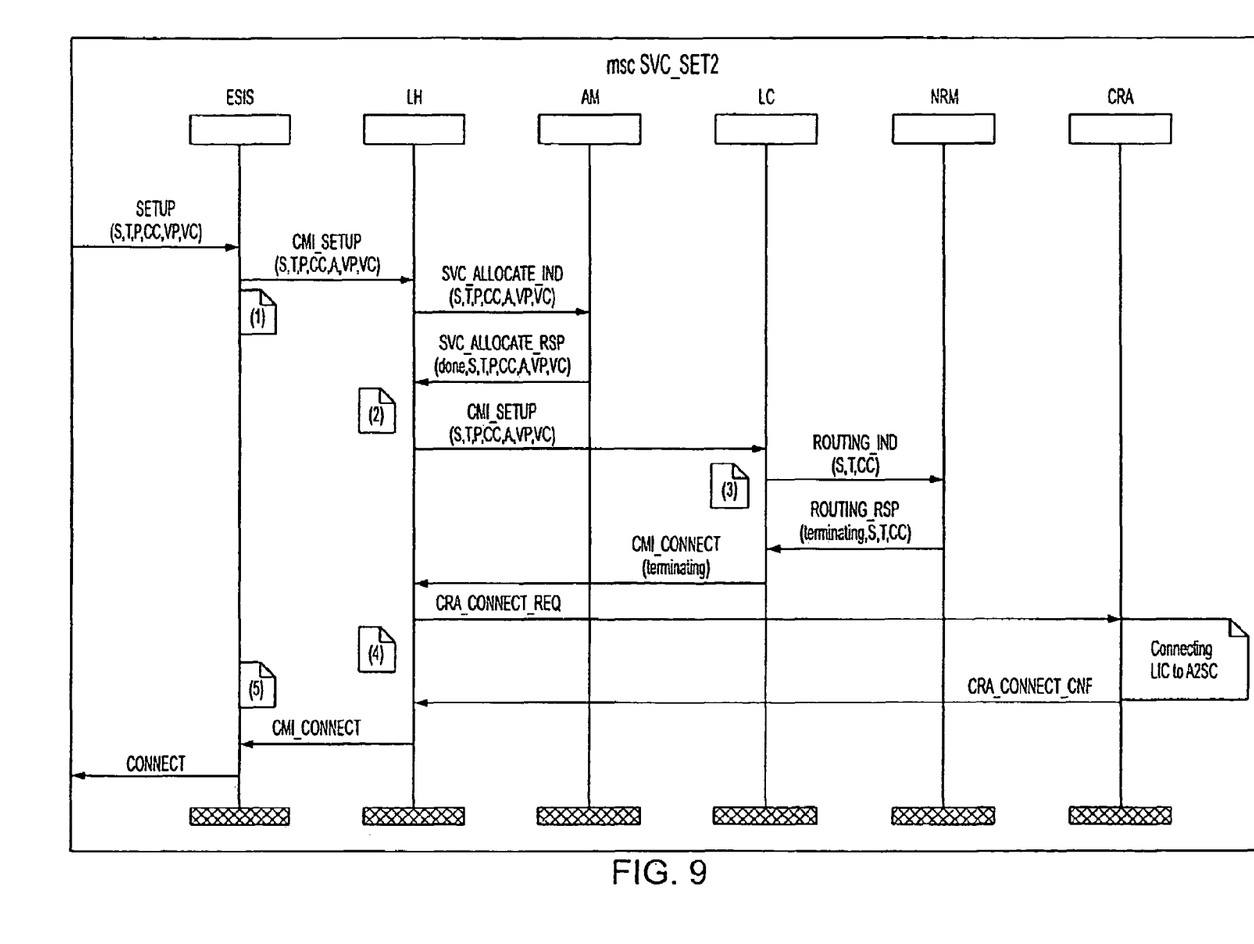
FIG. 9: Path setup at the destination endpoint

Referring to FIG. 9, ESIS receives a SETUP message from its protocol handler, decodes the SETUP message, includes the access, and sends a CMI_SETUP to the leg handler of SVC control.

(2)

LH calls AM for verification of the path data (VPCI, VCI, path identifier). AM reserves the resources in accordance to the requested connection characteristics. On positive acknowledgement, LH passes the CMI_SETUP to the leg controller.

(3)

LC calls NRM, delivering source and target information, eventually including additional route selection criteria. NRM declares that the target has been reached. LC sets up a CMI_CONNECT message towards LH, containing an indication that the path is to be terminated.

(4)

Interpreting the termination flag, LH calls CRA, and requests the LIC to be connected to an A2SC. After having received the confirmation, LH passes the CMI_CONNECT to ESIS.

0.9.3 (5)

ESIS Decodes the Message, and Transmits it Over the Preceeding Link 0.9.4 Path Release at the Originating Endpoint (1)

Figure 10:
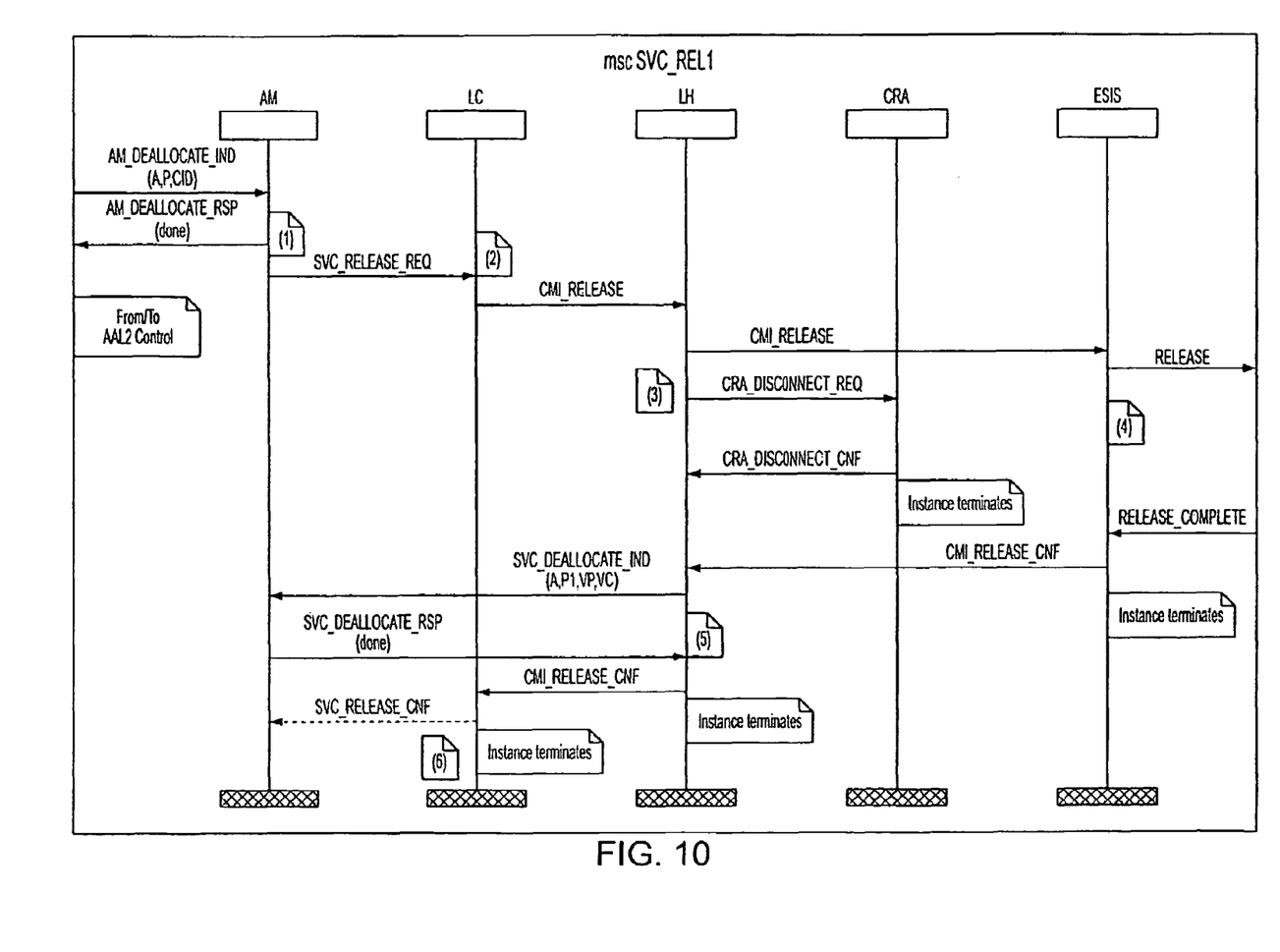
FIG. 10: Path release at the originating endpoint

Referring to FIG. 10, AM deallocates resources for an AAL type 2 connection, and finds out that the path resources fell below the release threshold value. AM calls the leg controller of SVC control to release an inactive path.

(2)

LC sets up a CMI_RELEASE message, and sends it to LH.

(3)

LH passes the message to ESIS. Simultaneously, LH issues a disconnect request towards CRA.

(4)

ESIS sends a RELEASE message to its succeeding link, receives a RELEASE_COMPLETE message, and transmits a CMI_RELEASE_CNF to LH. The ESIS instance terminates.

(5)

LH coordinates the arrival of the disconnect confirmation from CRA with the arrival of the CMI_RELEASE_CNF message from ESIS. If both messages are present, LH calls AM to release VPCI and VCI, (eventually also the path identifier), and to deallocate the resources of the path. If done, LH forwards the CMI_RELEASE_CNF to LC, and terminates.

(6)

LC confirms to AM, and terminates. AM releases the path identifier (if not yet done on deallocation).

0.9.5 Path Release at the Destination Endpoint (1)

Figure 11:
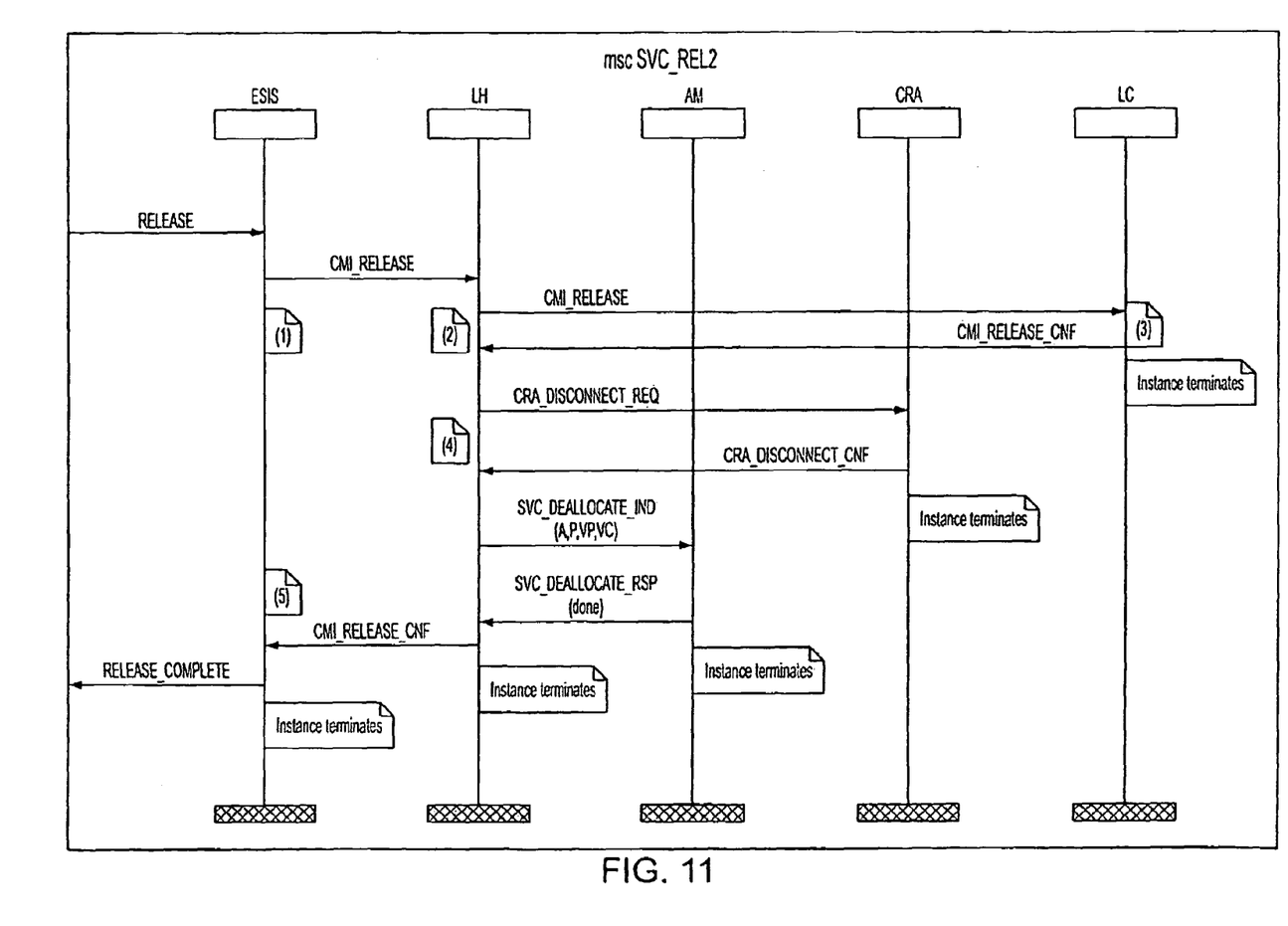
FIG. 11: Path release at the destination endpoint

Referring to FIG. 11, ESIS receives a RELEASE message from its adjacent network element, decodes the RELEASE message, and forwards a CMI_RELEASE message to LH.

(2)

LH informs LC.

(3)

LC reflects a CMI_RELEASE_CNF and terminates.

(4)

LH requests disconnection of the path from CRA. On positive reply, LH calls AM for deallocation of the resources. Finally LH acknowledges to ESIS and terminates.

(5)

ESIS sends a RELEASE_COMPLETE message over its external link and terminates.

0.10 Timers

ESIS provides timers as required by Q.2931.

When SVC control is triggered by AM to set up or to release a path, timing is required, and well positioned at the LC instance.

0.11 Transit Path Setup

Considering a path setup at the destination endpoint as shown above, we let NRM state that the target network element has been reached. But what to do, if NRM responses with result category 'routing destination', indicating the path to be routed further? Principally there are three options to react on.

Option 1: The Single Hop Solution

SVC control acts as if the routing result 'local destination' has been received, that is, the path is terminated within the network element. Providing eventually 'missing path links' towards the target network element is left to AM lateron, triggered by AAL2 connection setups originating in the given network element.

Option 2: The Multiple Hop Solution

SVC control terminates the path within the network element, however continues to setup an outgoing leg. AM, upon receiving a request for path resource allocation, now decides to setup another path or not. If AM rejects with an indication 'Rejected, path available', SVC control releases the outgoing leg, and the job is finished. If AM accepts, SVC control continues to establish the path as usual. As a result, we have another path originating in the network element, and either terminating somewhere at an intermediate network element, or at the target network element.

Option 3: The Transit Solution

SVC control does not terminate the path in the network element. Instead, AM is called by the outgoing leg handler to allocate resources for a path, which is the same as the incoming one. Towards the periphery, SVC control switches through the path in the classical way, that is, from LIC to LIC.

The invention claimed is:

1. A method for transmitting information in paths of an asynchronous transfer mode (ATM) network, comprising:

initiating setup of at least one new path in the ATM network if a capacity of a path currently used for transmission of information exceeds a setup threshold:
assigning ATM channels to the at least one new path after setting-up the at least one new path; and
initiating release of at least one path in the ATM network if a capacity of a path currently used for transmission of information is below a release threshold;
wherein decisions on at least one of initiating path setups and initiating path releases are made in response to at least one of a new call and a new data transmission, and
wherein making a decision regarding a path takes into account the capacity of the path currently used for transmission of information and required future capacity.

2. The method according to claim 1, wherein at least one of the setup threshold and the capacity of the path currently used for transmission corresponds to accumulated cell rates.

3. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at least one new path after setting-up the at least one new path; and
initiating release of at least one path in the ATM network if a capacity of a path currently used for transmission of information is below a release threshold:
wherein the capacity of the path currently used for transmission corresponds to a number of currently used ATM-channels in at least one path.

4. The method according to claim 1, wherein the setup and release thresholds are preset values.

5. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at least one new path after setting-up the at least one new path; and
initiating release of at least one path in the ATM network if a capacity of a path currently used for transmission of information is below a release threshold;
wherein the setup and release thresholds are variable values that are set via the ATM network.

6. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at. least one new path after setting-up the at least one new path; and
initiating release of at least one path in the ATM network if a capacity of a path currently used for transmission of information is below a release threshold;
wherein the ATM network comprises an ATM-AAL2 network.

7. The method according to claim 1, wherein the setup threshold exceeds the release threshold.

8. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at least one new path after setting-up the at least one new path; and
initiating release of at least one path in the ATM network if a capacity of a path currently used for transmission of information is below a release threshold;
wherein the capacity of the path currently used for transmission of information corresponds to current traffic in at least one path of all currently used paths.

9. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at least one new path after setting-up the at least one new path; and
initiating release of at least one path in the ATM network if a capacity of a path currently used for transmission of information is below a release threshold;
wherein at least one of the setup threshold and the release threshold corresponds to at least one of a minimum and a maximum of a distance between currently used network resources and all available path resources.

10. The method according to claim 1, wherein a path comprises an ATM virtual channel connection (VCC).

11. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at least one new path after setting-up the at least one new path; and
initiating release of at least one path in the ATM network if a capacity of a path currently used for transmission of information is below a release threshold;
wherein an ATM channel comprises an ATM adaption layer (AAL) channel.

12. The method according to claim 1, wherein after setting-up more than one path, each of the more than one paths is filled completely with ATM-channels before starting to fill another path with ATM channels.

13. A method for transmitting information in paths of an asynchronous transfer mode (ATM) network, comprising:
initiating setup of at least one new path in the ATM network if a capacity of a path currently used for transmission of information exceeds a setup threshold;
assigning ATM channels to the at least one new path after setting-up the at least one new path; and
initiating release of at least one path in the ATM network if a capacity of a path currently used for transmission of information is below a release threshold;
wherein a path release for at least one path in the ATM network is initiated if the capacity of the path currently used for transmission of information is below a threshold during at least a preset period of time or if the capacity of the path currently used for transmission is on average below a threshold during at least a preset period of time.

14. A device for transmitting information in paths of an asynchronous transfer mode (ATM) network, comprising:
means for storing thresholds,
means for determining a capacity of a path currently used for transmitting information over the ATM network;
means for comparing the capacity of the path currently used for transmitting information and at least one stored threshold;
means for initiating a path setup of at least one new path in the ATM network if the capacity of the path currently used for transmission of information exceeds a setup threshold, wherein after setup of the at least one new path, ATM-channels are assigned to the at least one new path; and means for initiating release of at least one path in the ATM network if the capacity of the path currently used for transmission of information is below a release threshold;

wherein decisions on at least one of initiating path setups and initiating path releases are made in response to at least one of a new call and a data transmission, and wherein making a decision regarding a path takes into account the capacity of the path currently used for transmission of information and required future capacity.

15. Device according to claim 14, wherein at least one of the setup and release thresholds and the capacity of the path currently used for transmission of information corresponds to accumulated cell rates.

16. A device for transmitting information in paths of an asynchronous transfer mode (ATM) network, comprising:
means for storing thresholds;
means for determining a capacity of a path currently used for transmitting information over the ATM network;
means for comparing the capacity of the path currently used for transmitting information and at least one stored threshold;
means for initiating a path setup of at least one new path in the ATM network if the capacity of the path currently used for transmission of information exceeds a setup threshold, wherein after setup of the at least one new path, ATM-channels are assigned to the at least one new path; and
means for initiating release of at least one path in the ATM network if the capacity of the path currently used for transmission of information is below a release threshold;
wherein the path currently used for transmission of information corresponds to a number of currently used ATM-channels in at least one path.

17. The device according to claim 14, wherein the setup and release thresholds are preset values.

18. A device for transmitting information in paths of an asynchronous transfer mode (ATM) network, comprising:
means for storing thresholds;
means for determining a capacity of a path currently used for transmitting information over the ATM network;
means for comparing the capacity of the path currently used for transmitting information and at least one stored threshold;
means for initiating a path setup of at least one new path in the ATM network if the capacity of the path currently used for transmission of information exceeds a setup threshold, wherein after setup of the at least one new path, ATM-channels are assigned to the at least one new path; and
means for initiating release of at least one path in the ATM network if the capacity of the path currently used for transmission of information is below a release threshold;
wherein the setup and release thresholds are variable values that are set via the ATM network.

19. A device for transmitting information in paths of an asynchronous transfer mode (ATM) network, comprising:
means for storing thresholds;
means for determining a capacity of a path currently used for transmitting information over the ATM network;
means for comparing the capacity of the path currently used for transmitting information and at least one stored threshold;
means for initiating a path setup of at least one new path in the ATM network if the capacity of the path currently used for transmission of information exceeds a setup threshold, wherein after setup of the at least one new path, ATM-channels are assigned to the at least one new path; and
means for initiating release of at least one path in the ATM network if the capacity of the path currently used for transmission of information is below a release threshold;
wherein the ATM network comprises an ATM-AAL2 network.

20. A device for transmitting information in paths of an asynchronous transfer mode (ATM) network, comprising:
means for storing thresholds;
means for determining a capacity of a path currently used for transmitting information over the ATM network;
means for comparing the capacity of the path currently used for transmitting information and at least one stored threshold;
means for initiating a path setup of at least one new path in the ATM network if the capacity of the path currently used for transmission of information exceeds a setup threshold, wherein after setup of the at least one new path, ATM-channels are assigned to the at least one new path; and
means for initiating release of at least one path in the ATM network if the capacity of the path currently used for transmission of information is below a release threshold;
wherein a threshold for setup of at least one path is bigger than a threshold for release of at least one path.

21. The device according to claim 14, wherein the capacity of the path currently used for transmission of information corresponds to current ATM network traffic.

22. A device for transmitting information in paths of an asynchronous transfer mode (ATM) network, comprising:
means for storing thresholds;
means for determining a capacity of a path currently used for transmitting information over the ATM network;
means for comparing the capacity of the path currently used for transmitting information and at least one stored threshold;
means for initiating a path setup of at least one new path in the ATM network if the capacity of the path currently used for transmission of information exceeds a setup threshold, wherein after setup of the at least one new path, ATM-channels are assigned to the at least one new path; and
means for initiating release of at least one path in the ATM network if the capacity of the path currently used for transmission of information is below a release threshold;
wherein at least one of the setup threshold and the release threshold corresponds to at least one of a minimum and a maximum of a distance between currently used network resources and available path resources.

23. The device according to claim 14, in which at least a component of the device is provided at an access point of the ATM network.

24. The device according to claim 14, wherein a path comprises an ATM-VCC (virtual channel connection).

25. A device for transmitting information in paths of an asynchronous transfer mode (ATM) network, comprising:

means for storing thresholds:

means for determining a capacity of a path currently used for transmitting information over the ATM network;

means for comparing the capacity of the path currently used for transmitting information and at least one stored threshold;

means for initiating a path setup of at least one new path in the ATM network if the capacity of the path currently used for transmission of information exceeds a setup threshold, wherein after setup of the at least one new path, ATM-channels are assigned to the at least one new path; and means for initiating release of at least one path in the ATM network if the capacity of the path currently used for transmission of information is below a release threshold;

wherein a an ATM channel comprises an AAL2 channel.

26. The device according to claim 14, wherein after a setup of more than one path, each path is filled completely with ATM-channels before starting to fill another path with ATM channels.

27. A device for transmitting information in paths of an asynchronous transfer mode (ATM) network, comprising:

means for storing thresholds;

means for determining a capacity of a path currently used for transmitting information over the ATM network;

means for comparing the capacity of the path currently used for transmitting information and at least one stored threshold;

means for initiating a path setup of at least one new path in the ATM network if the capacity of the path currently used for transmission of information exceeds a setup threshold, wherein after setup of the at least one new path. ATM-channels are assigned to the at least one new path; and means for initiating release of at least one path in the ATM network if the capacity of the path currently used for transmission of information is below a release threshold;

wherein a path release for at least one path in the ATM network is initiated if the capacity of the path currently used for transmission of information is below a threshold during at least a preset period of time or if the capacity of the path currently used for transmission of information is on average below a threshold during at least a preset period of time.

* * * * *